United States Patent [19]

Gehring, Jr.

[11] 3,942,056
[45] Mar. 2, 1976

[54] BRUSH HOLDER AND RIGGING ASSEMBLY FOR A DYNAMOELECTRIC MACHINE

[75] Inventor: Adolph J. Gehring, Jr., Schenectady, N.Y.

[73] Assignee: General Electric Company, Schenectady, N.Y.

[22] Filed: Mar. 27, 1975

[21] Appl. No.: 562,537

[52] U.S. Cl. .............................................. 310/241
[51] Int. Cl.² ..................................... H02K 13/00
[58] Field of Search ........... 310/239, 219, 240, 229, 310/241, 230, 244, 231, 242, 232, 51, 245, 66, 246, 233, 247, 236

[56] References Cited
UNITED STATES PATENTS

| | | | |
|---|---|---|---|
| 1,560,724 | 11/1925 | Potts | 310/230 UX |
| 1,927,176 | 9/1933 | Langley | 310/241 |
| 2,679,606 | 5/1954 | Baudry | 310/241 |
| 3,482,135 | 12/1969 | Hurlin | 310/239 |

Primary Examiner—R. Skudy
Attorney, Agent, or Firm—Vale P. Myles

[57] ABSTRACT

A dynamoelectric machine having a rotatable commutator and a plurality of brushes mounted in brush holders is provided with a rigging assembly that operates to prevent the commutator from being forced into contact with the brush holders when the machine is subjected mechanical shocks. The brush holders are mounted on a yoke member that is resiliently biased to a predetermined spacing relative to the commutator. A limit stop on the yoke member is positioned to contact a spacer ring on the commutator when a mechanical shock forces the commutator toward the brush assemblies, thereby to prevent the commutator from contacting the brush assemblies.

11 Claims, 2 Drawing Figures

BRUSH HOLDER AND RIGGING ASSEMBLY FOR A DYNAMOELECTRIC MACHINE

BACKGROUND OF THE INVENTION

This invention relates to dynamoelectric machines and more particularly to a brush holder and rigging assembly that prevents the brush holder from coming in contact with the commutator when the dynamoelectric machine is subjected to high shock forces.

Dynamoelectric machines that are used on board a ship can be subjected to very high shock forces which cause the rotor to move radially with respect to the stator. If the shock force is great enough the commutator bars can strike the brush holder with considerable force thereby causing damage to the commutator segments.

One possible solution to this problem is to mount the brush holders far enough away from the commutator so that the commutator cannot come in contact with the brush holders even when the dynamoelectric machine is subjected to a maximum anticipated shock force. This solution has been found to be unsatisfactory because a brush so held tends to be unstable during normal operation due to the increased extension of the brush from the brush holder to the commutator.

U.S. Pat. No. 2,679,606, Baudry et al, discloses a brush rigging assembly that minimizes the effect of certain disturbing vibrational forces that occur at particular frequencies. In Baudry et al, the brush rigging assembly includes an outer yoke member and a concentric inner yoke member. The inner yoke member is fastened rigidly to the base of the machine and the outer yoke member is resiliently mounted to the inner yoke by spring means. The brush holders are mounted on the movable outer yoke. The characteristic of the spring mounting means is such that the brush rigging assembly is resilient to the disturbing vibrational frequencies yet provides a substantial rigidity to any low frequency forces that tend to cause the brush rigging assembly to go out of alignment with respect to the axis of the commutator assembly. Baudry et al does not provide any means in addition to the spring suspension for absolutely limiting the relative motion of the commutator with respect to the brush holder.

It is, therefore, an object of this invention to provide an improved brush holder and rigging assembly for a dynamoelectric machine.

It is another object of this invention to provide a dynamoelectric machine in which the distance that the commutator can travel with respect to the brush holder is limited to a distance less than the normal clearance between the commutator segments and the end of the brush holder.

SUMMARY OF THE INVENTION

In accordance with one embodiment of the invention a dynamoelectric machine includes a support ring concentric with the rotor shaft and attached in fixed relation with respect to the stator frame. The brush holders are mounted on a yoke member having an outer cylindrical surface that is concentric with the support ring and an inner cylindrical surface that is concentric with the rotor. A plurality of spring loaded studs mounted in the support ring apply forces radially inward about the outer cylindrical surface of the yoke member so that there is normally a distance, a, between the edge of the brush holder and the commutator surface. The rotor surface opposite the inner cylindrical surface of the yoke is built up so that the clearance between the built up rotor surface and the inner cylindrical surface of the yoke is less than the distance between the commutator bars and the edge of the brush holder. Thus, the distance that the commutator surface can move in a radial direction with respect to the edge of the brush holders is limited to the clearance between the built up surface of the rotor and the inner cylindrical surface of the yoke.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1:
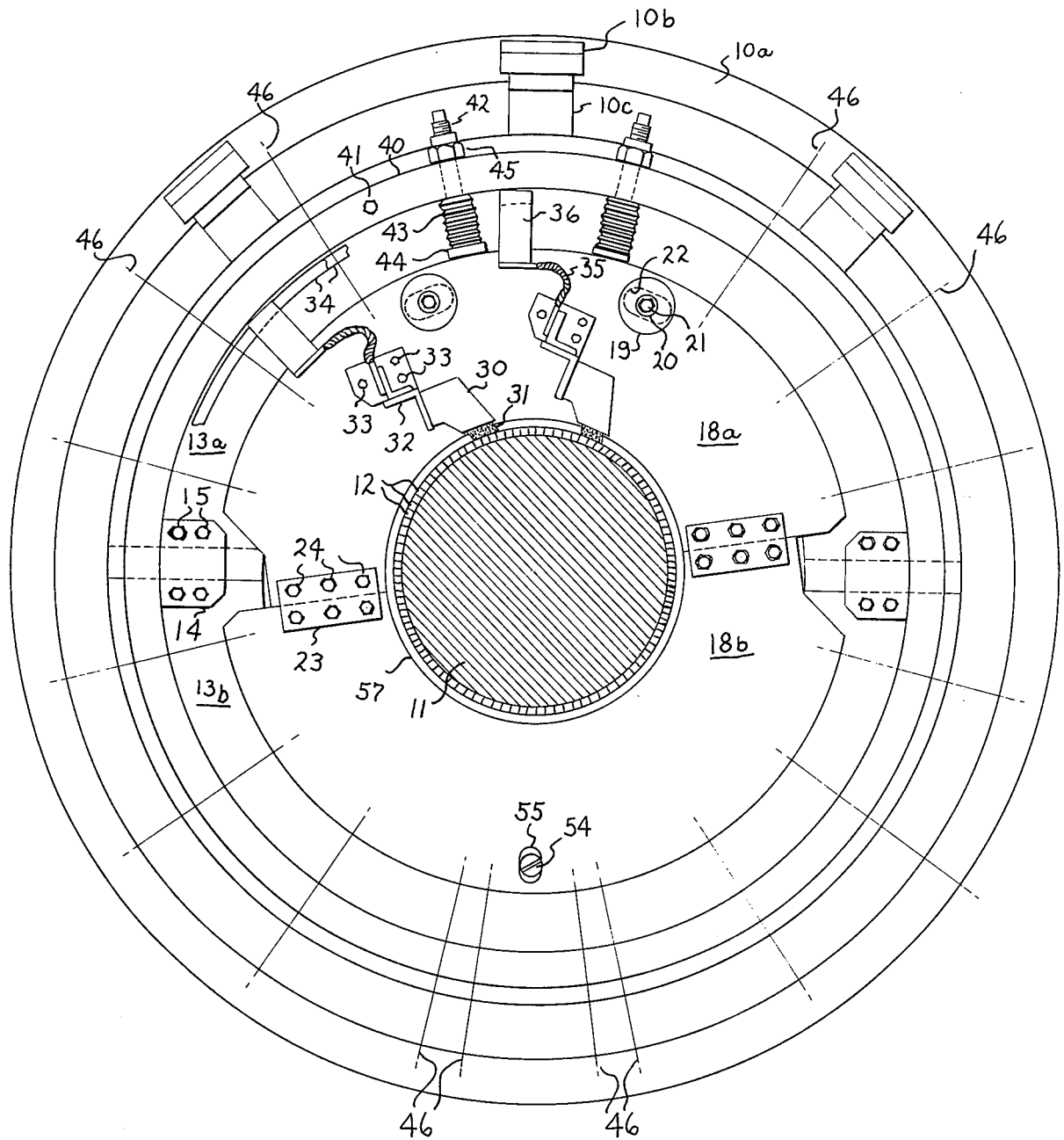
FIG. 1 is a simplified end view of a brush rigging assembly for holding carbon brushes in engagement with the commutator of a dynamoelectric machine.

Referring now to the drawings wherein for the sake of convenience the same part will retain the same element number throughout each figure, there is shown a brush rigging assembly for a dynamoelectric machine having a stator frame assembly 10 and a rotor member 11. The rotor 11 has a plurality of commutator segments 12 about its periphery. Mounted on the stator frame member 10c is a stationary supporting yoke member 13, which as shown in FIG. 1 can consist of two semicircular rings 13a and 13b held together by means of plates 14 and bolts 15. A movable yoke member 18 is held against the stationary yoke member by means of washers 19, spring members 20 and bolts 21. The movable yoke member 18 has clearance holes 22 for bolts 21 that are considerably larger than the bolt diameter thereby allowing the movable yoke 18 to undergo radial motion with respect to the stationary yoke 13. Spring members 20 facilitate the adjustment of the compressive forces set up by bolts 21 so that the movable yoke 18 does not undergo any appreciable axial motion, yet will be allowed to undergo radial motion upon the application of a high shock load. As shown in FIG. 1, the movable yoke 18 can also consist of two semicircular rings 18a and 18b held together by means of plates 23 and bolts 24.

Brush holder assemblies 30 each housing a plurality of brushes 31 are mounted on a brush holder bracket 32. The brush holder bracket 32 is secured to the movable yoke 18 by bolts 33. The brush leads, not shown, are fastened to the brush holder bracket 32. The brush current is conducted to the machine bus rings 34 through flexible conducting straps 35 and contact members 36.

The stationary yoke 13 includes an annular support ring 40 secured by means of a plurality of bolts 41. The support ring 40 contains a plurality of holes, each containing a stud 42 extending therethrough. A spring 43 mounted on the stud shaft between the stud head 44 and the annular support ring 40 forces the stud head 44 radially inward until it contacts the outer cylindrical surface of the movable yoke 18. A self-locking nut 45 limits the inward travel of the stud head 44. A plurality of such studs 42 are used to position the movable yoke 18 with respect to the rotor assembly 11. For the sake of simplifying the drawing, FIG. 1 shows two such studs 42 in detail, it being understood that other studs 42 exist at positions, as indicated by center lines 46, to provide support for the movable yoke 18 about its entire circumference. Thus, the spring loaded studs provide a means for resiliently mounting the movable yoke member 18.

Figure 2:
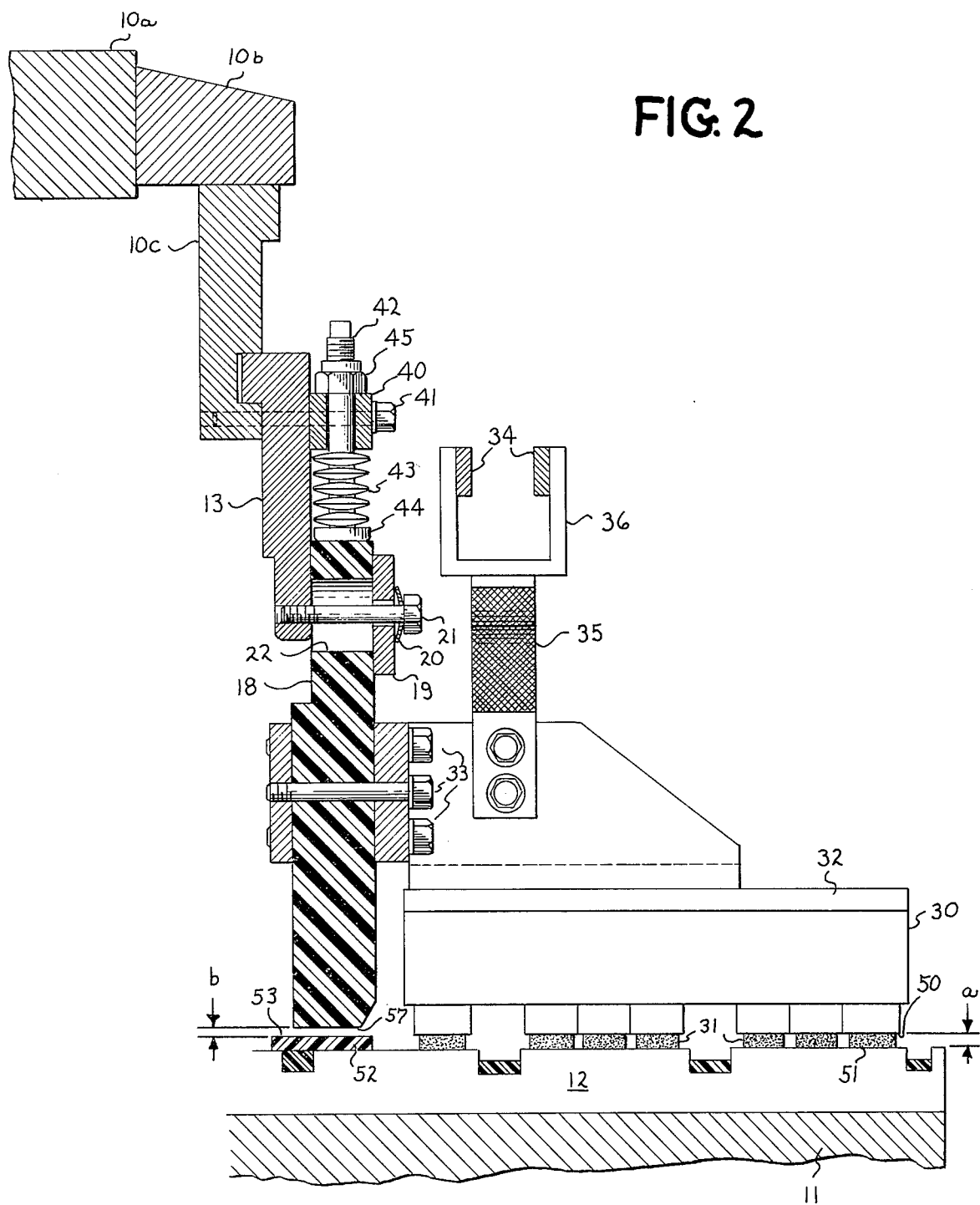
FIG. 2 is a cross-sectional view of a portion of the brush rigging assembly depicted in FIG. 1.

When the self-locking nuts 45 are properly positioned, the stud heads 44 will position the movable yoke 18 so that it is concentric with the rotor 11 in the absence of any shock force and so that there is a distance, $a$, between the commutator surface 51 and the edge 50 of the brush holder 30. As shown in FIG. 2 the rotor diameter is increased by the addition of some material 51 about the rotor circumference opposite the inner cylindrical surface 57 of the movable yoke 18. The thickness of material 52 is such that the distance, $b$, between the inner cylindrical surface 51 of the yoke 18 and the surface 53 of the material 52 is less than the distance, $a$, between the commutator surface 51 and the brush holder edge 50.

Under normal operating conditions, and in the absence of any large shock forces, the spring loaded studs 42 will position the movable yoke 18 with the attached brush holders 30 so that the brushes contact the commutator surface 51 and so that there is a clearance, $a$, between the edge 50 of the brush holder and the commutator surface 51. When the dynamoelectric machine is subjected to a shock force which causes the rotor 11 to move with respect to the stator, the amount of relative motion between the commutator surface 51 and the edge 50 of the brush holders is limited to the distance, $b$. Once the rotor 11 moves the distance, $b$, in an outward radial direction surface 53 will come in contact with the inner cylindrical surface 57 of the movable yoke. Any further outward radial motion of the rotor 11 will result in corresponding motion of the movable yoke 18 including the attached brush holder assemblies. Since the amount of relative motion between the edge 50 of the brush holder 30 and the commutator surface is limited to the distance, $a$, minus the distance, $b$, the edge of the brush holder is effectively prevented from coming in contact with the commutator surface 51. As the yoke 18 moves the spring assemblies 43 are compressed in the direction of yoke movement. Since the spring assemblies 43 are limited to their inward travel, the spring assemblies 43 opposite the direction of movement will no longer exert any force on yoke 18. Thus, all spring forces are restorative when shock force stops. Upon removal of the shock force the compressed spring assemblies 43 will act to restore the movable yoke 18 to concentric alignment with rotor 11.

In the embodiment disclosed in FIG. 1, the stationary yoke 13 can include a dowel 54 that protrudes into a slot 55 in movable yoke 18. As shown, the slot is oriented so that the long dimension is in the vertical direction which facilitates vertical motion of the movable yoke assembly in response to shock forces directed in the vertical direction but facilitates a slight rotation of the yoke assembly about dowel 54 when the shock force is applied in other than a vertical direction.

While the present invention has been described with reference to a specific embodiment thereof, it will be obvious to those skilled in the art that various changes and modifications may be made without departing from the invention in its broader aspects.

It is contemplated in the appended claims to cover all variations and modification of the invention which come within the true spirit and scope of the invention.

What is claimed as new and desired to be secured by Letters Patent of the United States is:

1. An improved brush rigging assembly for use with a dynamoelectric machine having a stator member and a rotor member, said rotor member including a plurality of commutator segments forming a cylindrical commutator member, comprising:
    a. a yoke member having a surface concentric with a surface of the rotor;
    b. a plurality of brush holders mounted on the yoke member; and
    c. means for resiliently mounting the yoke member to the stator so that the brush holders are normally spaced a distance, $a$, from the commutator segments and so that the yoke member surface is normally spaced a distance, $b$, less than the distance, $a$, from said rotor surface whereby when the dynamoelectric machine is subjected to a high shock force the rotor surface contacts the yoke surface which prevents the brush holders from coming in contact with the commutator segments.

2. An improved brush rigging assembly as recited in claim 1 wherein the stator includes a support ring concentric with the yoke member and wherein the resilient mounting means includes a plurality of compressed spring means mounted between the support ring and the periphery of the yoke for maintaining the yoke in axial alignment with the rotor.

3. An improved brush rigging assembly as recited in claim 2 additionally comprising means for clamping the yoke to the stator so that radial movement of the yoke is permitted while substantially no axial motion of the yoke is permitted.

4. An improved brush rigging assembly as recited in claim 3 wherein the yoke has a plurality of clearance holes and wherein the clamp means comprises a plurality of spring loaded bolts, said clearance holes being substantially larger than the bolt shafts thereby allowing the yoke to move in the radial direction.

5. An improved brush rigging assembly as recited in claim 2 wherein the spring means comprise spring loaded stud assemblies mounted in the support ring for applying the alignment force to the periphery of the yoke.

6. An improved brush rigging assembly as recited in claim 4 wherein the spring means comprise spring loaded stud assemblies mounted in the support ring for applying the alignment force to the periphery of the yoke.

7. An improved brush rigging assembly as recited in claim 2 wherein the yoke includes a slot and the stator includes a dowel extending through the slot to assist in aligning the yoke member.

8. An improved brush rigging assembly as recited in claim 7 wherein the slot is aligned in a radial direction.

9. An improved brush rigging assembly as recited in claim 6 wherein the yoke includes a slot and the stator includes a dowel extending through the slot to assist in aligning the yoke member.

10. An improved brush rigging assembly as recited in claim 9 wherein the slot is aligned in a radial direction.

11. An improved brush rigging assembly for use with a dynamoelectric machine having a stator member and a rotor member, said rotor member including a plurality of commutator segments forming a cylindrical commutator member, comprising:
a. a fixed yoke member rigidly attached to the stator of the dynamoelectric machine,
b. a movable yoke member having a surface concentric with a surface of the rotor,
c. a plurality of brush holders mounted on the movable yoke member, and
d. means for resiliently mounting the movable yoke member to the fixed yoke member so that the brush holders are normally spaced a distance, $a$, from the commutator segments and so that the movable yoke member surface is a distance, $b$, less than the distance, $a$, from said rotor surface whereby when the dynamoelectric machine is subjected to a high shock load the rotor surface contacts the movable yoke surface which prevents the brush holders form coming in contact with the commutator segments.

* * * * *